Figure 1:
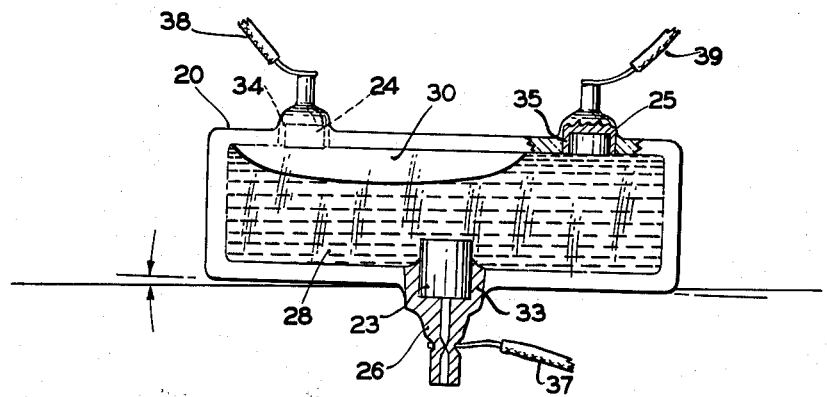

Sept. 21, 1965　　　　　W. R. POLYE　　　　　3,208,023
ELECTROLYTE FOR A SEALED LIQUID LEVEL CURRENT CONTROL DEVICE
Filed Jan. 28, 1960

INVENTOR.
WILLIAM R. POLYE
BY
ATTORNEY

United States Patent Office 3,208,023
Patented Sept. 21, 1965

3,208,023
ELECTROLYTE FOR A SEALED LIQUID LEVEL CURRENT CONTROL DEVICE
William R. Polye, River Edge, N.J., assignor to the Bendix Corporation, a corporation of Delaware
Filed Jan. 28, 1960, Ser. No. 5,168
12 Claims. (Cl. 338—44)

The invention relates to an improved electrolyte for use in a conventional sealed type liquid level current control device and more particularly to an electrolyte which involves a substantial improvement over electrolytic solutions heretofore used in such type devices in that the improved electrolyte includes a hydrogen acceptor or absorber and is such that substantially no free gaseous products liberated from the electrolyte during the operation of the current control device may accumulate in the sealed control device.

It has been observed that in such prior type electrolytic current control devices, there has arisen a problem in that the electrolyte previously in use has been such that hydrogen is generated at the electrodes thereof so that under given electrical current load conditions the operating life of the device has been determined by the internal pressure of the liberated gaseous products that the walls of the device can withstand. Catastrophic failure and explosion may mark the end point in the life of such devices using the conventional type electrolytic solutions, such as potassium iodide or cadmium iodide in methanol and water or sodium iodide in methanol and which electrolytic solutions may possess many of the otherwise desirable characteristics of an electrolyte for use in such devices.

Various forms of electrolytic current control devices have been heretofore employed especially in connection with gyroscopic devices. A few illustrations of typical liquid level current control devices are shown in U.S. Patent No. 2,890,430, granted June 9, 1959, to Fred Jean Cid and assigned to Bendix Aviation Corporation. In each of these, any tilt or sidewise component of acceleration causes the bubble in the electrolyte to move resulting in the bubble either opening the switch circuit or the electrolyte in its movement relative to the electrodes changing the resistance between the electrodes of the electrolytic current control device.

The conduction of electricity by the electrolyte of such current control devices has resulted in polarization or the evolution of gas, primarily hydrogen at the electrodes. The magnitude of the electrode voltage drop, the current and its waveform (A.C. or D.C.) and the material of the electrodes are factors which have heretofore been considered to determine the rate of gas evolution for a given electrolyte. Such electrolytic current control devices are almost always used in strictly alternating current circuits and it is presumed in such case that the potential at the electrodes reverses before all the nascent hydrogen evolved at the electrodes may combine into molecular hydrogen. Verification of this was indicated by experiments in which it was found that increasing the frequency of the alternating current decreased the rate of hydrogen formation, although the generation of hydrogen at electrodes carrying alternating current was observed to continue.

In solution of the problem of the generation of hydrogen in such electrolytes, it has been an object of the present invention to provide an electrolyte having therein a hydrogen acceptor or absorber which is both a compatible additive for the electrolyte and which forms upon hydrogenation a constituent which is also completely compatible with the conduction of electricity by the electrolyte.

Another object of the invention is to provide in the electrolyte an unsaturated hydrocarbon to which hydrogen ions may be attached in the generation of hydrogen by polarization so as to form by hydrogenation propyl alcohol which is completely compatible with the conduction of electricity by the electrolyte while avoiding the accumulation of free hydrogen gases in the sealed electrolytic current control device during such polarization.

Other objects and advantages of this invention are set forth in the following description and the novel features thereof are pointed out in the appended claims. The disclosure, however, is illustrative only and changes may be made therein within the principle of the invention to the full extent indicated by the broad and general meanings of the terms in which the appended claims are expressed.

In the drawings:

FIGURE 1 is a drawing of a typical sealed liquid level current control device in which the improved electrolytic solution is designed for use to solve the problem of electrochemical reactions in prior electrolytes which have been found to be responsible for the destruction of such devices due to the liberation of free gaseous hydrogen from the prior electrolytes during the current control operation of such devices.

Figure 2:
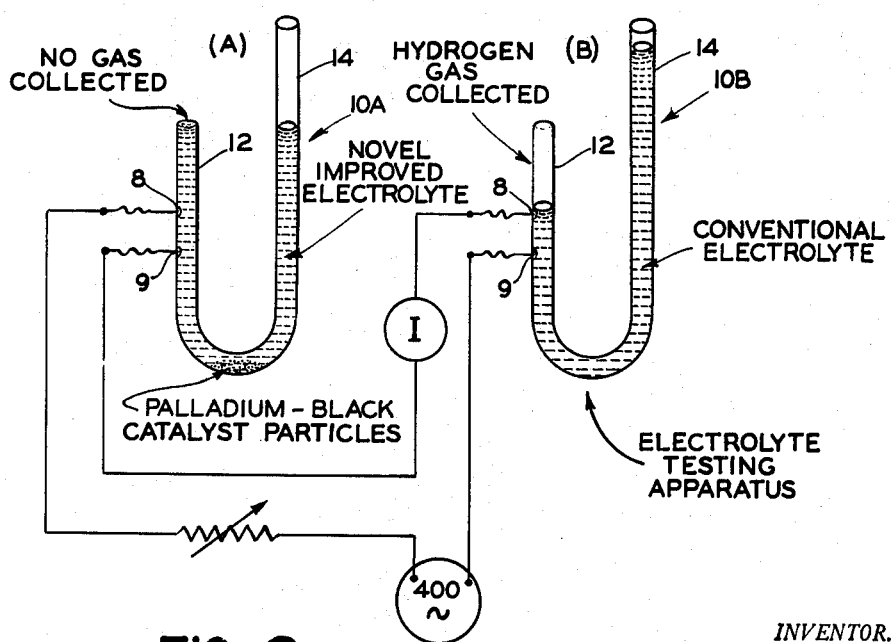

FIGURE 2 is a schematic drawing illustrating an electrolytic testing apparatus for measuring the volume of free hydrogen generated by polarization in the improved electrolyte of the present invention as compared with that generated in a prior electrolytic solution of 0.5 normal potassium iodide in methanol and 5 percent water by weight in which parts (A) and (B) illustrate manometers containing such identical electrolytes except that there is allyl alcohol added to the electrolyte of part (A) as specified in the present invention, while the electrolyte is without allyl alcohol in part (B) and the drawing further illustrates that the passage of an identical 400 cycle alternating current through each of these parts has resulted in the steady accumulation of hydrogen in the part (B) while there is no hydrogen gas accumulation in the part (A) containing the improved electrolyte of the present invention.

The generation of hydrogen at electrodes carrying alternating current may be observed in several different ways. First, there is the bursting of completed current control devices after finite operating time; however, in laboratory tests, controlled measurements were made using test cells and microscopic observation to note the appearance of small hydrogen bubbles at electrodes. Another apparatus which was used for measuring volumes of hydrogen generated is shown in FIGURE 2. As hydrogen is generated at the electrodes 8 in the side-wall of each of the manometer 10A and 10B, the electrolyte level in the left column of each manometer 12 may be expected to be depressed. Since the right column 14 is open to the atmosphere, the volume of displaced electrolyte equals the volume of gas produced substantially at atmospheric pressure.

The electro-chemical reactions responsible for the production of hydrogen in such a current control device reveal the total amount of hydrogen which is available from the electrolyte, but do not indicate its rate of production. Reactions which are thought to occur in one widely used electrolyte are as follows:

Electrolyte: 0.5 normal potassium iodide in methanol with 5% water (by weight).

During electrolysis:

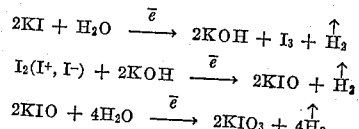

According to these reactions, 2 mols of KI may produce eventually a total of 6 mols of hydrogen. One particular current control device being manufactured contained 0.16 cc. of the electrolyte cited above. The computed amount of potassium iodide in such device was $6.4 \times 10^{-5}$ mols; therefore, the amount of hydrogen it is possible to generate in the device was three times the molar quantity of KI or $1.9 \times 10^{-4}$ mols. In terms of volume, this represents 4.25 cc. of hydrogen measured at standard temperature and pressure. The bubble volume of this switch is 0.22 cc. Initially, the bubble pressure is 1 atmosphere; therefore, the liberation of hydrogen in this case would cause the bubble pressure eventually to rise to 21 atmospheres at standard temperature. The measured bursting pressure of such current control devices lies between 10 and 20 atmospheres; thus it is possible for such a device to burst in service. Consideration of other electrolytes of this kind lead to similar conclusions which have been substantiated by actual experience and laboratory measurements.

In attempting to find a solution to this problem, several possible means for disposing of generated hydrogen were studied. These studies included the use of hydrogen acceptors or absorbers such as spongy platinum, platinum black, palladium black, zinc oxide, and others. These considerations finally led to the use of an unsaturated hydrocarbon to which hydrogen ions may be attached usually in the presence of a catalyst. Although many different unsaturated hydrocarbons may be used such as the pinene group (terpene, essential oils, etc.), unsaturated alcohols, and others, the compound chosen was allyl alcohol, $CH_2=CH-CH_2OH$. This compound is a compatible additive for electrolytes and was found to hydrogenate readily at normal pressures and temperatures in the presence of catalytic palladium. A hydrogen ion attaches to each carbon atom at the double bond and yields propyl alcohol as follows:

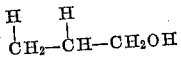

The formation of propyl alcohol from allyl alcohol hydrogenation represents a further distinct advantage since propyl alcohol is also completely compatible with the electrolyte.

Since each molecule of allyl alcohol requires two atoms of hydrogen for complete hydrogenation, one gram molecular weight of allyl alcohol (58 g.) will take on one mol of hydrogen (2 g. or 22.4 liters, STP). For the particular current control device cited previously, $1.9 \times 10^{-4}$ mols of hydrogen could be generated; therefore, this device should be provided with $1.9 \times 10^{-4}$ mols (or 0.01 g.) allyl alcohol plus a small quantity of catalyst.

The experimental verification of hydrogen disposal using allyl alcohol in an electrolyte with catalyst was obtained using pairs of switch electrodes in the side-walls of manometers as shown in FIGURE 2. Parts (A) and (B) illustrate manometers containing identical electrolytes with and without allyl alcohol respectively. The passage of 400 cycle alternating current through each of these resulted in the steady accumulation of hydrogen in (B) and no hydrogen gas accumulation in (A).

Further experimental verification included operating production-type switches in their actual circuits with identical electrolytes in each except for allyl alcohol and catalyst added to some. After 100 or more hours of operation, samples of each type were broken open within the sample chamber of a gas chromatograph. This apparatus measured large quantities of hydrogen generated in the standard switches, but no hydrogen in those containing allyl alcohol.

Additional experiments using the gas chromatograph substantiated the hydrogenation of allyl to propyl alcohol in operating switches by detecting and measuring the amount of propyl alcohol formed in the electrolytes of these switches.

In the disclosure herein of FIGURE 1, there is shown a typical electrolytic switch including a glass receptacle 20 having electrodes of a suitable material not chemically attacked by the electrolyte, such as platinum or carbon electrodes 23, 24 and 25, such as disclosed in the aforenoted U.S. Patent No. 2,890,430 granted June 9, 1959 to Fred Jean Cid.

The glass receptacle 20 may be partially filled through a suitable filling tube 26 with the improved electrolyte 28 so as to leave an air bubble 30 at the top and the receptacle 20 may in turn be sealed by crimping the filling tube in a conventional manner. The electrodes 23, 24 and 25 are carried in electrical conductive cup shaped elements 33, 34 and 35 respectively mounted in the glass receptacle 20 and which elements are connected to electrical conductor wires 37, 38 and 39, as shown, and through a suitable electrical circuit to a source of electrical energy, not shown.

As explained in the aforenoted patent, at the normal or level position of the receptacle 20, the ends of the meniscus of the liquid electrolyte 28 barely engage the surfaces of upper electrodes 24 and 25 and a high impedance is presented to the flow of current between the upper electrodes 24 and 25 and lower electrode 23. Upon a tilting of the receptacle 20 more of one surface of electrode 24 or 25 is exposed to the electrolyte and less of the other electrode surface. The increase in exposed surface area lowers the impedance to current flow so that a greater amount of current flows between a top and bottom electrode. This increase and decrease in current flow may be applied through the electrical conductor wires 37–38 and 37–39 connected to the electrodes so as to operate through a suitable control circuit the erection motors, for example, of a vertical gyro so as to maintain the gyro in an erect position.

Heretofore in the hydrogen bearing electrolyte in use in prior type electrolytic current control devices there has been liberated hydrogen gases at the respective electrodes by polarization; i.e., the effect produced on the electrolyte at the electrodes by the disposition at the electrodes of hydrogen gases liberated from the electrolyte by the electric current flow. Accumulation of the liberated hydrogen gases in the sealed receptacle of such prior devices has heretofore resulted in the development of hydrogen gas pressures in many cases greater than that which the walls of the glass receptacle of such prior devices could well withstand and causing destruction of the device.

The present invention is directed to an improvement in such liquid level current control devices in that the accumulation of such liberated gaseous hydrogen is effectively prevented through the use of electrolyte containing a hydrogen acceptor such as unsaturated allyl alcohol, compatible with the electrolyte and forming propyl alcohol from allyl alcohol hydrogenation which is also completely compatible with the electrolyte.

A typical electrolyte 28 embodying the improvement of the present invention may have the following composition:

0.5 normal potassium iodide in methanol
5 percent water by weight
20 percent allyl alcohol by weight Another electrolyte embodying the improvement of the present invention may have the following composition:

0.3 normal sodium iodide in methanol
20 percent allyl alcohol by weight

Another further electrolyte embodying the improvement of the present invention may have the following composition:

0.5 normal cadmium iodide in methanol
5 percent water by weight
20 percent allyl alcohol by weight.

In each of the foregoing examples of the invention a small quantity of palladium black catalyst is added to the electrolyte to promote hydrogenation of the unsaturated hydrocarbon allyl alcohol.

The amount of the unsaturated compound is not critical, although obviously, of course, mere traces are without practical utility as they would be used up before a satisfactory life for the current control device had been completed. The quantity of the allyl alcohol or hydrogen acceptor should be related to the quantity of the hydrogen gas capable of being produced and the bursting strength of the receptacle. Twenty percent of the allyl alcohol by weight in the electrolyte protects against hydrogen pressure for many hours and, in general, it is not necessary to use larger proportions, although they do no harm. As a matter of fact, there is no point in using more unsaturated compound than is stoichiometrically equivalent to the iodide for, of course, after all of the iodide is used up, there is no oxygen acceptor left and, in general, there is no point in providing a much larger amount of the unsaturated compound which is the hydrogen acceptor.

From the foregoing, it will be readily seen that there has been provided an improved liquid level current control device in which the accumulation of gaseous hydrogen is prevented through the use of improved electrolytes containing unsaturated hydrocarbon compounds.

While several forms of the invention are specifically illustrated herein, it is to be clearly understood that the invention is not to be limited thereto, but that the same are to be considered merely as illustrative of the practice thereof; since the invention is not to be limited except by the appended claims.

What is claimed is:

1. In a liquid level current control device of a type including a closed receptacle containing an electrolyte of substantially .5 normal potassium iodide in methanol with five percent by weight of water, and electrodes each having a surface adapted to contact said electrolyte to provide upon polarization thereof a current conducting path between said electrolyte and said electrodes, and the electrolyte containing at least one component which on electrolysis sets free hydrogen producing producing a gaseous pressure within the closed receptacle tending to burst the receptacle; the improvement wherein said electrolyte includes therein a thinly fluid dispersion of substantially twenty percent by weight of allyl alcohol to combine by hydrogenation with free hydrogen liberated from the electrolyte during the polarization at the contacting surfaces of said electrodes, and palladium black catalyst to promote the hydrogenation of the allyl alcohol so as to form thereby propyl alcohol in and compatible with the electrolyte and at a sufficiently rapid rate as to prevent an accumulation of gaseous hydrogen within the closed receptacle sufficient to burst the receptacle under the gaseous pressure thereof.

2. In a liquid level current control device of a type including a closed receptacle containing an electrolyte of substantially .3 normal sodium iodide in methanol, and electrodes each having a surface adapted to contact said electrolyte to provide upon polarization thereof a current conducting path between said electrolyte and said electrodes, and the electrolyte containing at least one component which on electrolysis sets free hydrogen producing a gaseous pressure within the closed receptacle tending to burst the receptacle; the improvement whereof in said electrolyte includes therein a thinly fluid dispersion of substantially twenty percent by weight of allyl alcohol to combine by hydrogenation with free hydrogen liberated from the electrolyte during the polarization at the contacting surfaces of said electrodes, and palladium black catalyst to promote the hydrogenation of the allyl alcohol so as to form thereby propyl alcohol in and compatible with the electrolyte and at a sufficiently rapid rate as to prevent an accumulation of gaseous hydrogen within the closed receptacle sufficient to burst the receptacle under the gaseous pressure thereof.

3. In a liquid level current control device of a type including a closed receptacle containing an electrolyte of substantially .5 normal cadmium iodide in methanol with five percent by weight of water, and electrodes each having a surface adapted to contact said electrolyte to provide upon polarization thereof a current conducting path between said electrolyte and said electrodes, and the electrolyte containing at least one component which on electrolysis sets free hydrogen producing a gaseous pressure within the closed receptacle tending to burst the receptacle; the improvement wherein said electrolyte includes a thinly fluid dispersion of twenty percent by weight of allyl alcohol to combine by hydrogenation with free hydrogen liberated from the electrolyte during the polarization at the contacting surfaces of said electrodes, and palladium black catalyst to promote the hydrogenation of the allyl alcohol so as to form thereby propyl alcohol in and compatible with the electrolyte and at a sufficiently rapid rate as to prevent an accumulation of gaseous hydrogen within the closed receptacle sufficient to burst the receptacle under the gaseous pressure thereof.

4. In a liquid level current control device of a type including a closed receptacle containing an electrolyte of an alkali metal iodide in a solvent methanol and electrodes, each of said electrodes having a surface adapted to contact said electrolyte to provide upon polarization thereof a current conducting path between said electrolyte and said electrodes, and the electrolyte containing at least one component which on electrolysis sets free hydrogen producing a gaseous pressure within the closed receptacle tending to burst the receptacle; the improvement wherein said electrolyte includes therein a thinly fluid dispersion of an unsaturated hydrocarbon compound of allyl alcohol, said allyol alcohol combining by hydrogenation with the hydrogen liberated from the electrolyte during polarization at the contacting surfaces of said electrodes so as to thereby form propyl alcohol in and compatible with the electrolyte, and said allyl alcohol being in a condition and present in a quantity capable of combining by said hydrogenation with an amount of the liberated hydrogen sufficient to maintain the gaseous hydrogen pressure within the closed receptacle at a pressure below a bursting pressure of the receptacle.

5. The improvement defined by claim 4 wherein the electrolyte includes a catalyst to promote the hydrogenation of the allyl alcohol with the liberated hydrogen within the closed receptacle and formation thereby of propyl alcohol in the electrolyte at a sufficiently rapid rate as to prevent the bursting of the closed receptacle under the gaseous pressure of the liberated hydrogen.

6. In a liquid level current control device of a type including a closed receptacle of a frangible material, said receptacle containing an electrolyte of a salt in methanol, and electrodes, each of said electrodes having a surface adapted to contact said electrolyte to provide upon polarization thereof a current conducting path between said electrolyte and said electrodes, and the electrolyte containing at least one component which on electrolysis sets free hydrogen producing a gaseous pressure within the closed receptacle tending to burst the receptacle; the improvement wherein said electrolyte includes a thinyl fluid dispersion of an unsaturated hydrocarbon compound of allyl alcohol, said allyl alcohol combining by hydrogenation with the free hydrogen liberated from the electrolyte during polarization at the contacting surface of said electrodes so as to thereby form propyl alcohol in the electrolyte, and said allyl alcohol being in a condition and present in a quantity capable of combining by said hydrogenation with an amount of the free hydrogen and at a rate sufficient to maintain the gaseous hydrogen pressure within the receptacle at a pressure below a bursting pressure of the frangible receptacle.

7. In a liquid level current control device of a type including a closed frangible receptacle, said receptacle being partially filled with a solution of an electrolyte in ionizing solvents containing at least one component which on electrolysis sets free hydrogen generating a gaseous pressure within the closed receptacle tending to burst the receptacle, the amount of the electrolyte solution being sufficient to permit formation of a gas bubble, electrodes having surfaces adapted to contact said electrolyte to provide a current conducting path between said electrolyte and said electrodes, said receptacle being adjustably positioned, and said current conducting path being interruptable by said bubble dependent upon the position of said receptacle; the improvement which comprises a thinly fluid dispersion in the electrolyte of a hydrogen acceptor, said hydrogen acceptor being chemically compatible with the electrolyte and in a condition and quantity at least sufficient to react with an amount of the free hydrogen sufficient to maintain the hydrogen gaseous pressure within the receptacle at a pressure below a bursting pressure of the receptacle, and said hydrogen acceptor in reacting with said free hydrogen forming a compound electrically compatible with the electrolyte and which compound remains thinly fluidly dispersed in the electrolyte.

8. In a liquid level current control device, the improvement as defined by claim 7 in which the hydrogen acceptor is an unsaturated organic solvent and there is present a hydrogenation catalyst to cause the reaction of the hydrogen acceptor with the free hydrogen at a rate sufficiently rapid as to prevent the bursting of the receptacle under the gaseous hydrogen pressure.

9. In a liquid level current control device, the improvement as defined by claim 8 in which the electrolyte is an alcoholic solution of a soluble halide.

10. In a liquid level current control device, the improvement as defined by claim 9 in which the electrolyte is an alkali metal iodide dissolved in methanol and the unsaturated component is an unsaturated alcohol.

11. In a liquid level current control device, the improvement as defined by claim 10 in which the unsaturated alcohol is allyl alcohol.

12. A liquid level current control device including a closed frangible receptacle partially filled with a solution of an electrolyte in ionizing solvents containing at least one component which on electrolysis sets free hydrogen producing a gaseous pressure within the closed receptacle tending to burst the receptacle, the amount of the electrolyte solution being sufficient to permit formation of a gas bubble, electrodes having surfaces adapted to contact said electrolyte to provide a current conducting path between said electrolyte and said electrodes, said receptacle being adjustably positioned, and said current conducting path being interruptable by said bubble dependent upon the position of said receptacle; an improvement which comprises a thinly fluid dispersion in the electrolyte of a hydrogen absorber, said hydrogen absorber having an affinity for free hydrogen and being in a quantity at least sufficient to effectively absorb said free hydrogen from a free gaseous state, and the hydrogen absorber acting to absorb a sufficient quantity of the free hydrogen to prevent a concentrated accumulation of gaseous hydrogen within the receptacle of said liquid level current control device sufficient to burst the closed receptacle under the gaseous pressure thereof.

References Cited by the Examiner

UNITED STATES PATENTS 2,890,430  6/59  Cid ------------------ 338—44
2,934,581  4/60  Dassler ------------- 204—28

FOREIGN PATENTS 713,523  8/31  France.

RICHARD M. WOOD, *Primary Examiner.*

MARCUS A. LYONS, MAX L. LEVY, *Examiners.*

UNITED STATES PATENT OFFICE
CERTIFICATE OF CORRECTION

Patent No. 3,208,023                        September 21, 1965

William R. Polye

It is hereby certified that error appears in the above numbered patent requiring correction and that the said Letters Patent should read as corrected below.

Column 2, line 66, for that portion of the formula reading "$I_3$" read -- $I_2$ --; column 4, line 68, for "Another" read -- A --; column 5, line 41, strike out "producing", second occurrence; column 6, line 34, for "allyol" read -- allyl --; line 61, for "thinyl" read -- thinly --.

Signed and sealed this 12th day of April 1966.

(SEAL)
Attest:

ERNEST W. SWIDER                        EDWARD J. BRENNER
Attesting Officer                           Commissioner of Patents